United States Patent
Basu et al.

(10) Patent No.: US 9,088,518 B2
(45) Date of Patent: Jul. 21, 2015

(54) WEB SERVICES AND TELECOM NETWORK MANAGEMENT UNIFICATION

(75) Inventors: Sujoy Basu, Sunnyvale, CA (US); Gerald William Winsor, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1854 days.

(21) Appl. No.: 11/627,354

(22) Filed: Jan. 25, 2007

(65) Prior Publication Data
US 2008/0183850 A1    Jul. 31, 2008

(51) Int. Cl.
*G06F 15/173* (2006.01)
*H04L 12/24* (2006.01)

(52) U.S. Cl.
CPC ............. *H04L 41/50* (2013.01); *H04L 41/022* (2013.01)

(58) Field of Classification Search
CPC ............................. H04L 41/50; H04L 41/022
USPC .................. 709/203, 220–229; 707/104.1
See application file for complete search history.

(56) References Cited

U.S. PATENT DOCUMENTS

| | | | |
|---|---|---|---|
| 6,336,138 B1 * | 1/2002 | Caswell et al. | 709/223 |
| 7,072,960 B2 * | 7/2006 | Graupner et al. | 709/223 |
| 7,281,018 B1 * | 10/2007 | Begun et al. | 707/102 |
| 7,383,191 B1 * | 6/2008 | Herring et al. | 705/1 |
| 7,493,302 B2 * | 2/2009 | Emuchay et al. | 1/1 |
| 7,801,976 B2 * | 9/2010 | Hodges et al. | 709/223 |
| 2002/0104068 A1 * | 8/2002 | Barrett et al. | 717/104 |
| 2003/0145096 A1 * | 7/2003 | Breiter et al. | 709/231 |
| 2003/0208533 A1 * | 11/2003 | Farquharson et al. | 709/203 |
| 2004/0093381 A1 * | 5/2004 | Hodges et al. | 709/204 |
| 2004/0122693 A1 * | 6/2004 | Hatscher et al. | 705/1 |
| 2004/0139151 A1 * | 7/2004 | Flurry et al. | 709/203 |
| 2004/0249645 A1 * | 12/2004 | Hauser et al. | 705/1 |
| 2005/0027871 A1 * | 2/2005 | Bradley et al. | 709/227 |
| 2005/0050141 A1 * | 3/2005 | An et al. | 709/203 |
| 2005/0050311 A1 * | 3/2005 | Joseph et al. | 713/1 |
| 2005/0066058 A1 * | 3/2005 | An et al. | 709/246 |
| 2005/0144226 A1 * | 6/2005 | Purewal | 709/203 |
| 2005/0278270 A1 * | 12/2005 | Carr et al. | 706/25 |
| 2006/0031441 A1 * | 2/2006 | Davis et al. | 709/223 |
| 2006/0064483 A1 * | 3/2006 | Patel | 709/224 |
| 2006/0080289 A1 * | 4/2006 | Brunswig et al. | 707/3 |
| 2006/0106842 A1 * | 5/2006 | Diament et al. | 707/101 |
| 2006/0143229 A1 * | 6/2006 | Bou-Ghannam et al. | 707/104.1 |
| 2007/0073769 A1 * | 3/2007 | Baikov et al. | 707/104.1 |
| 2008/0031481 A1 | 2/2008 | Warren et al. | |
| 2008/0071816 A1 * | 3/2008 | Gray | 707/101 |
| 2008/0127047 A1 * | 5/2008 | Zhang et al. | 717/104 |

FOREIGN PATENT DOCUMENTS

WO    WO2007/093498    8/2007

OTHER PUBLICATIONS

Hiroshi Wada et al—"A Service-Oriented Design Framework for Secure Network Applications"—COMPSAC '06 vol. 1—Sep. 2006—pp. 359-368.

* cited by examiner

*Primary Examiner* — Catherine Thiaw
(74) *Attorney, Agent, or Firm* — Hewlett-Packard Patent Department (57) ABSTRACT

A method of unifying web services and telecom network management is described. The method comprises exporting an external model representation of at least one entity of a service oriented architecture of a service oriented architecture manager and importing the exported external model representation of the at least one entity as a network management data model entity of a network manager. The method further comprises subscribing, by the network manager, to subsequent updates of the at least one entity.

6 Claims, 8 Drawing Sheets

WEB SERVICES AND TELECOM NETWORK MANAGEMENT UNIFICATION

BACKGROUND

Telecommunication ("Telecom") service providers recruit third party independent software vendors (ISVs) to deliver services to run on the telecommunication network infrastructure, both within and outside the Telecom service provider domain. Telecom service providers need to be aware of how service outages affect their subscriber base consuming or registered to use the affected services. Some solutions, such as a Hewlett-Packard (HP) Service Delivery Platform (SDP), use a Service-Oriented Architecture (SOA) to deploy new services rapidly within the Telecom service provider infrastructure by reusing common services leveraging third party-provided services. The Telecom Network Operations Center (NOC) needs to be alerted about fault and performance issues at the SOA level so that potential "end-user service outages" can be addressed quickly. Telecom NOC staff monitor separate platforms, e.g., separate computer systems, in order to manage web services and telecom networks.

Telecommunication networks and web services providers exist in largely independent domains. The information models used by software from these different domains differ presenting difficulties to developers, users, and service and network providers. By not presenting the information from the information models in a single information model, the support staff may be delayed in responding to service issues.

For example, automatic announcement of web service outages are not possible unless the alerts raised by a web services management platform is sent to software generating the announcements.

DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION

Figure 1:
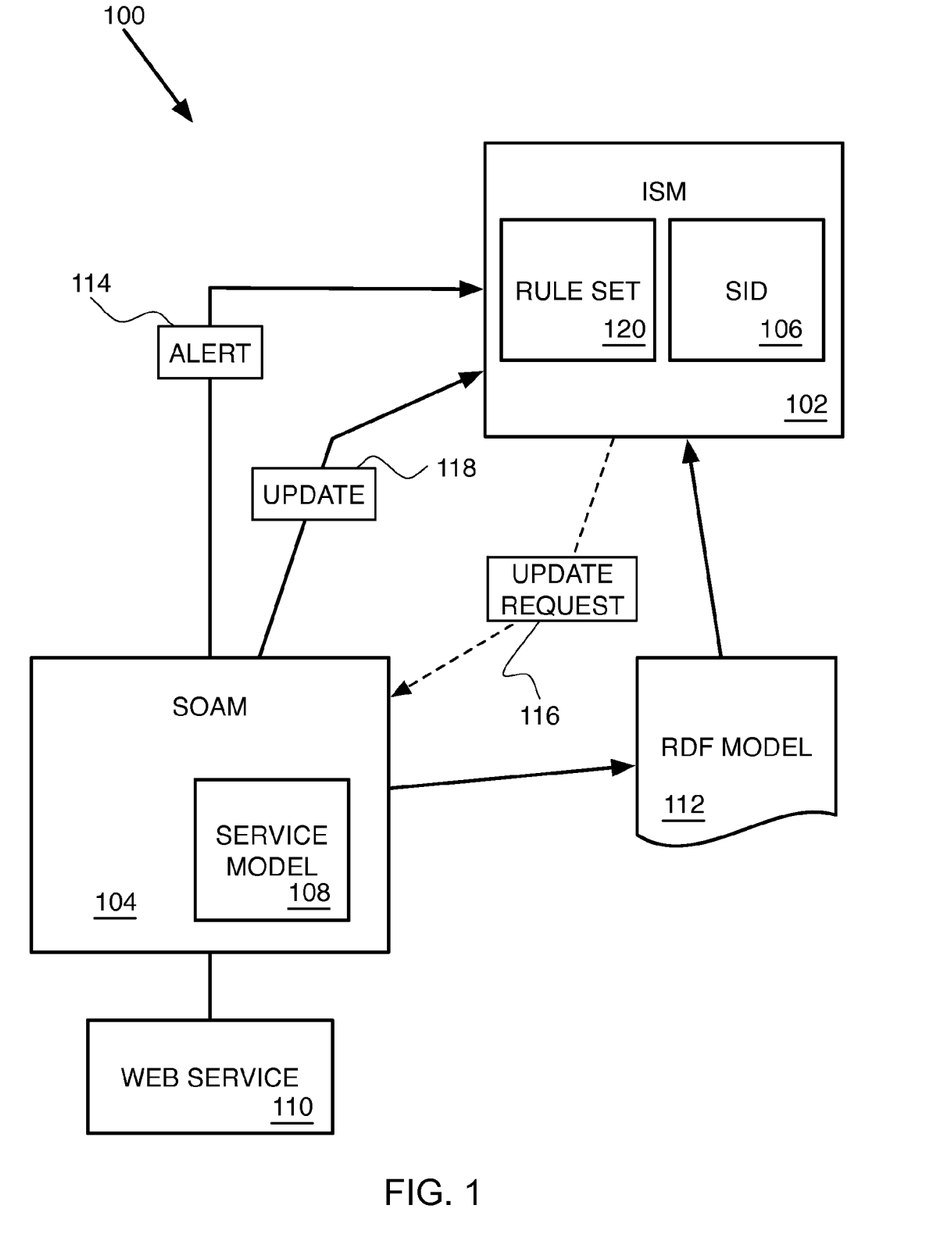
FIG. 1 is a high level functional block diagram of a system useable in conjunction with an embodiment.

FIG. 1 depicts a high level functional block diagram of a combined telecom network and web service management system 100 ('combined system') in conjunction with which an embodiment may be used to advantage. Combined system 100 comprises a telecom fault management (TFM) component 102 communicatively coupled with a service oriented architecture manager (SOAM) 104. An example TFM is the Integrated Services Management product available from Hewlett-Packard (HP) Company of Palo Alto, Calif. ISM 102 comprises a shared information and data model (SID) component 106 comprising an abstract representation of entities in a managed telecom network environment. SID 106 comprises representations of entities of the managed telecom network, as well as, attributes, constraints, and relationships of the represented entities. The particular SID 106 of a particular ISM 102 is an instantiation of the information model using specific data repository and access protocols and specifies a schema according to which data is stored and further specifies rules for manipulating the data. SOAM 104 comprises a service model 108 representing the dependencies of different business processes on a Web service 110 and the inter-dependencies of Web services. An example SOAM is the OPENVIEW SOA MANAGER available from HP. In at least some embodiments, SOAM 114 discovers services through a Web service registry, such as the Systinet registry, which adheres to the Universal Description, Discovery and Integration (UDDI) protocol. Web services may also be specified explicitly using a user interface or by creating a configuration file accessible by SOAM 114.

In accordance with at least some embodiments, SOAM 104 generates a Resource Description Framework (RDF) model 112 representation, i.e., an external model representation, of service model 108 and ISM 102 imports the RDF graph into SID 106. The RDF family of specifications from the World Wide Web Consortium provide a lightweight ontology for the exchange of knowledge in the Web. RDF captures the knowledge in a set of triples, each consisting of subject, predicate and object. XML provides a common notation for representing RDF triples, although it is not the only notation that can be used. RDF model 112 captures information in service model 108 of SOAM. In at least some embodiments, RDF model 112 captures the same information as in service model 108. After importation of RDF model 112 into SID 106, ISM 102 is able to obtain updated information for a Web service 110 from SOAM 104, and more particularly, information from service model 108 converted into the RDF model.

In at least some embodiments, SOAM 104 generates and transmits an alert signal 114 to ISM 102 in response to an update of status information for a particular Web service 110. The alert is generated within SOAM 104 by a monitoring engine based on metrics provided from the Web services and threshold values, e.g., performance thresholds, set by the operator on those metrics. In some embodiments, SOAM 104 generates and transmits alert signal 114 responsive to an update of status information from a particular web service 110. In some embodiments, alert signal 114 provides updated information to ISM 102 corresponding to updated information for service model 108 which caused the fault to be generated. In at least some other embodiments, ISM 102 requests an update (update request 116) from service model 108 of information in SID 106 corresponding to imported RDF model 112. In at least some embodiments, alert signal 114 comprises information identifying a particular web service 110 in service model 108 causing the alert signal and ISM 102 transmits update request 116 comprising information based on the representation of the particular identified Web service 110 to the service model.

In at least some embodiments, responsive to receipt of update request 116 from ISM 102, SOAM 104 generates and transmits an update 118 specifying updated information for service model 108. For example, if ISM 102 and SOAM 104 have not communicated for a period of time such that RDF model 112 imported into SID 106 are out of date, the ISM may transmit an update request 116 to the SOAM. In some embodiments, SOAM 104 generates and transmits an update 118 specifying updated information specific to the particular web service 110 which caused the generation of alert signal 114. In this manner, alerts generated by web service(s) 110 managed by SOAM 104 are provided to SID 106 and ISM 102 for presentation, e.g., via a display, to a user of the ISM, i.e., a single interface such as a telecom network management system may be used to interact with both telecom networks and web services. As described above, in some embodiments, alert 114 comprises the updated information specific to the particular web service 110 which caused the generation of alert signal 114.

In some further embodiments, ISM 102 may transmit a clear alert signal to SOAM 104. For example, in response to an alert 114 transmitted from SOAM 104 to ISM 102, the ISM may clear, e.g., reset, the fault in the corresponding entity in SID 106. Clearing the fault in SID 106 may then cause generation and transmission, e.g., by ISM 102, of a clear alert message to SOAM 104 and the corresponding entity in service model 108 and/or web service 110. In at least one embodiment, the clear alert message may be generated from ISM 102 as part of execution of a rule in rule set 120.

For simplicity and clarity, FIG. 1 depicts a single web service 110; however, in some embodiments, more than one web service may be present. Software that is accessible over a computer network and which provides specific functionality and supports interaction with other software entities on computers connected to the network may be regarded as a web service. In at least one embodiment, web services may follow standards in order to allow better tooling support from vendors. In at least one other embodiment, web services may not follow and/or may follow a select set of standards.

According to at least one example, the interfaces to web services may be according to Representational State Transfer (REST) or Simple Object Access Protocol (SOAP) specifications, or other conventions agreed among web service designers. For example, a shipping company may have implemented a business service to match vehicle drivers to package pickup requests received by the shipping company. The business service may access a location mapping web service which responds to a pickup request comprising a given location of the package and a given location of the nearest available driver by generating map images of the requested destination and route, and turn-by-turn directions.

SOAM 104 generates service model 108 based on discovering one or more Web service(s) 110 managed by the SOAM. Service model 108 represents web service(s) 110 discovered by SOAM 104 as managed entities and the dependencies of business services on the Web services, e.g., the dependency of the package and driver matching service on the location mapping Web service in the above example, and inter-dependency of Web services are represented in the service model.

Service model 108 entities managed by SOAM 104 differ from SID 106 entities managed by ISM 102. Service model 108 is a service model in an internal representation of SOAM 104, or in a language such as a Service Modeling Language (SML). SID 106 is a service model in the Shared Information and Data (SID) model, standardized in the Telecom Management Forum. RDF model 112 represents service model 108 entities corresponding to web service(s) 110 as a set of triples, e.g., a subject-predicate-object expression. For example, a particular web service 110 entity in service model 108 may comprise a name attribute such as "Name" and a unique identifier attribute such as "UniqueIdentifier." In some embodiments, a particular web service 110 entity comprises a name attribute and a unique identifier attribute and additionally a fault attribute such as "Fault." In at least some embodiments, a particular web service 110 entity comprises a service attribute, e.g., a response time, a throughput value, and other performance-related values. The service attribute may be compared to a threshold value by SOAM 104 in determining whether a service differs from a particular performance threshold, e.g., whether the service meets or exceeds a threshold, whether the service is below a given threshold, etc.

Figure 2:
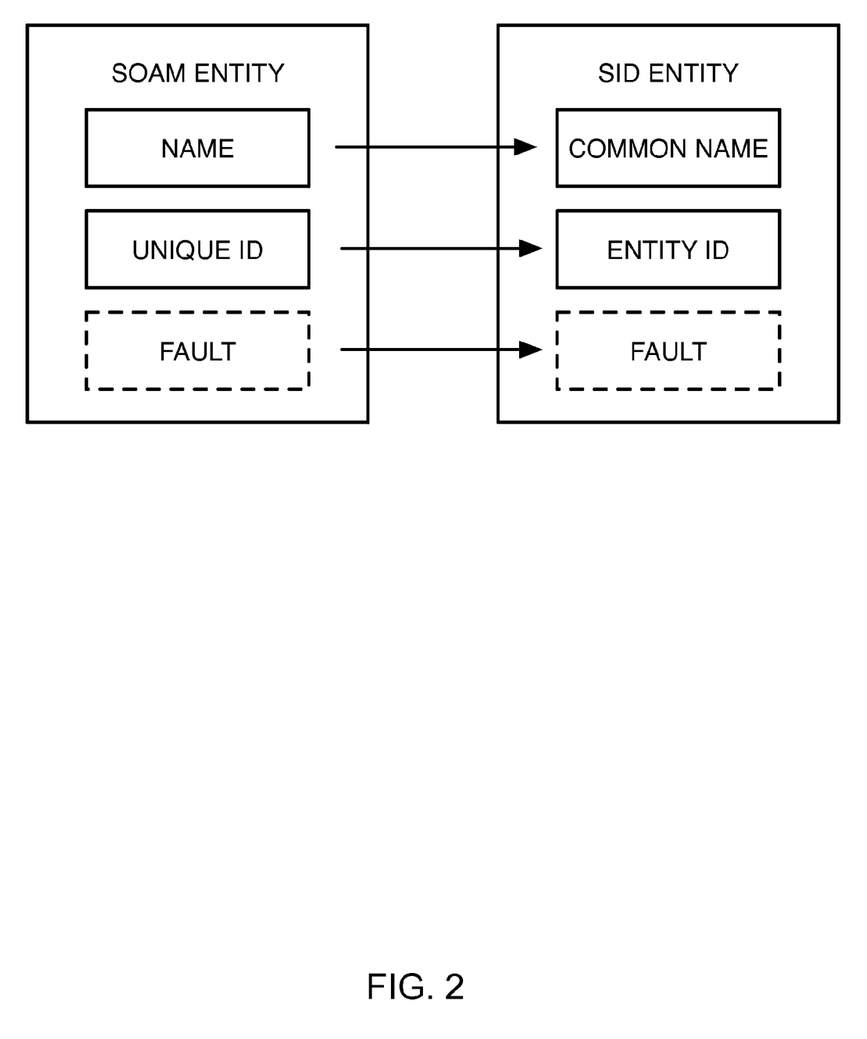
FIG. 2 is a high level block diagram of a mapping according to an embodiment.

Because of the entity differences between service model 108 entities and SID 106 entities, ISM 102 applies a rule set 120 to RDF model 112 entities in order to import (represent) the service model entities in the SID. In some embodiments, a web service 110 entity from service model 108 may be represented as a resource entity in SID 106 and a business process from the service model may be represented as a service in the SID. FIG. 2 depicts a high-level mapping of attributes between service model 108 entities and SID 106 entities. As depicted, optional attributes may be mapped, e.g., a fault attribute. For example, the above-described particular web service 110 entities attributes may be mapped as follows:

TABLE 1

|  | Service Model | SID |
|---|---|---|
| attribute | web service | resource |
| attribute | name | commonName |
| attribute | UniqueIdentifier | EntityIdentification |

TABLE 2

|  | Service Model | SID |
|---|---|---|
| attribute | web service | resource |
| attribute | name | commonName |
| attribute | UniqueIdentifier | EntityIdentification |
| attribute | fault | fault |

Rule set 120 comprises one or more rules applied by ISM 102 to entities of RDF model 112 during importation into SID 106. For example, the mapping specified in the above tables may be implemented in at least some embodiments using the following rules:

| Rule 1 | |
|---|---|
| (?W rdf:type SOAManager:WebService), | (?W rdf:type SID:Resource), |
| (?W SOAManager:hasName ?N), | → (?W SID:hasCommonName ?N), |
| (?W SOAManager:hasUniqueIdentifier ?I) | (?W SID:hasEntityIdentification ?I) |

| Rule 1A | |
|---|---|
| (?W rdf:type SOAManager:WebService), | (?W rdf:type SID:Resource), |
| (?W SOAManager:hasName ?N), | → (?W SID:hasCommonName ?N), |
| (?W SOAManager:hasUniqueIdentifier ?I), | (?W SID:hasEntityIdentification ?I) |
| (?W SOAManager:hasFault ?F) | (?W SID:hasFault ?F) |

Rules 1 and 1A indicate the mapping (indicated by the arrow) from service model 108 (left-hand side) to SID 106 (right-hand side). Per the rules, a variable "?W" is bound to a web service 110 in service model 108 and the variables "?N" and "?I" are bound respectively to the name and UniqueIdentifier attributes of a web service entity in the service model. ISM 102 transforms the entity to SID 106 by creating a resource entity and setting the commonName and EntityIdentification attributes to the values bound to the "?N" and "?I" variables, respectively. If web service 110 entity comprises a fault attribute, rule 1A preserves the fault attribute in the transformation and importation into SID 106. For example, variable "?F" is bound to the fault attribute and during transformation, ISM 102 sets the fault attribute of the SID 106 entity to the value bound to the "?F" variable.

In order to inform a user at a telecom NOC about a particular fault or performance degradation, e.g., an alert, related to a particular Web service, a function is specified using a web ontology language (OWL), i.e., a markup language used for specifying data by representing the meanings of terms using vocabularies and relationships between terms in a manner suitable for processing by a processor, to identify the particular web service via the SID 106 entity corresponding to the particular web service. For example, assuming ISM 102 comprises information specifying services to which a particular telecom network user is subscribed, e.g., the shipping company and/or the shipping company employee subscribing to a package and driver matching service, an example function to be applied to SID 106 to determine the subscriptions of the telecom network user is as follows:

```
<owl:ObjectProperty rdf:ID="subscribesTo" />
  <rdfs:domain rdf:resource="#User" />
  <rdfs:range rdf:resource="#Service" />
</owl:ObjectProperty>
```

The above function specification identifies the function and the resources applicable to the function in SID 106.

SOAM 104 maintains, in service model 108, dependency information regarding composite services reliant on underlying web service(s) 110. If an underlying web service 110 generates an alert, based on the dependency information in service model 108, the alert may be propagated to all composite services which depend on the web service. Based on the generated and propagated alert, SOAM 104 alerts (alert signal 114) ISM 102 to a fault.

Based on alert generation and propagation from SOAM 104 to ISM 102 as described above, an additional rule of rule set 120 may be applied to SID 106 to generate an alert for presentation to a telecom network user and/or a telecom network operator based on the following rule:

| Rule 2 | |
|---|---|
| (?S rdf:type SID:Service), | (?U getsServiceOutageAnnouncement ?S) |
| (?S SID:hasFault ?F), | → |
| (?U subscribesTo ?S) | |

ISM 102 applies Rule 2 to SID 106 based on receipt of an alert 114 from SOAM 104 and generates, for example, a service outage announcement. That is, the telecom network management system is able to generate an alert to a user based on occurrence of a fault in the web service management system.

Figure 3:
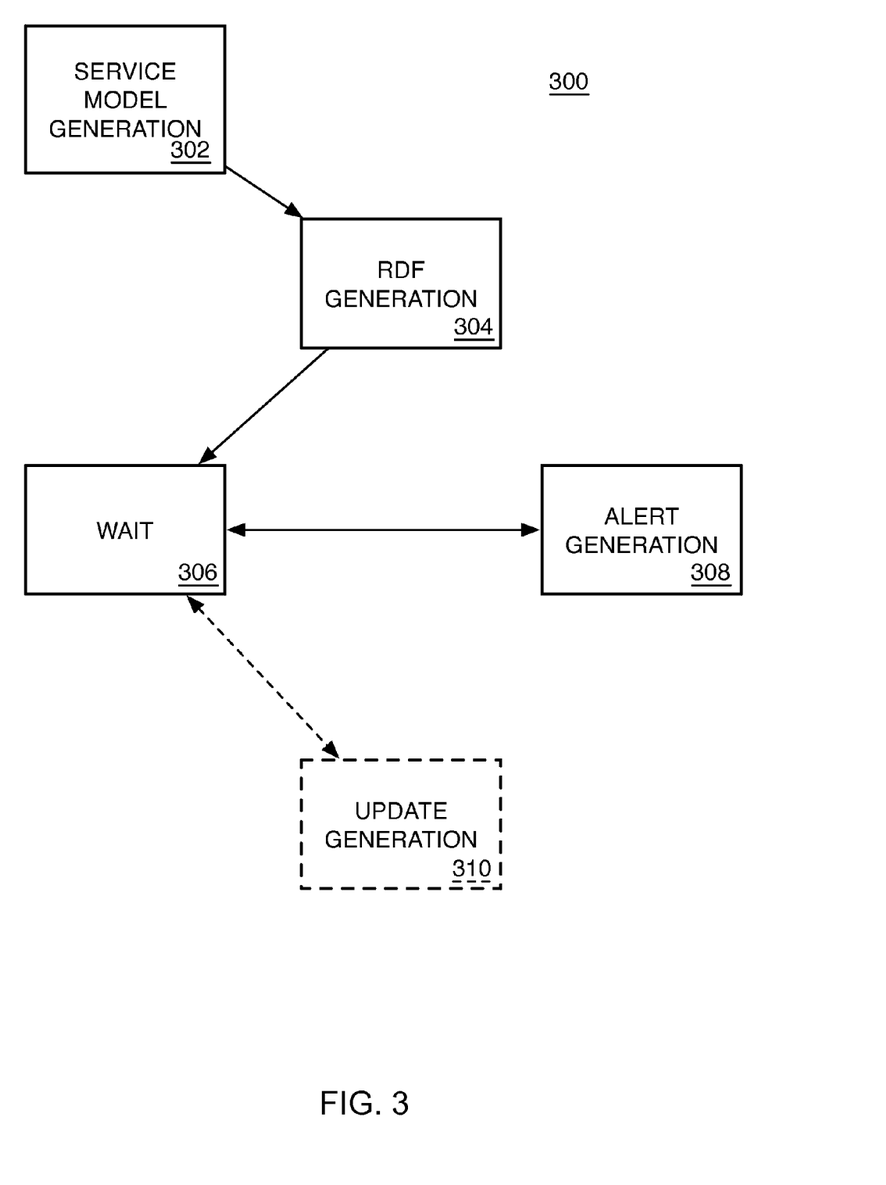
FIG. 3 is a high level process flow diagram of a portion of operation according to an embodiment.

FIG. 3 depicts a high level process flow diagram of a portion 300 of operation of SOAM 104 according to an embodiment. The process flow starts at service discovery 302 wherein SOAM 104 determines services available and generates service model 108 based on web services and business processes. The flow proceeds to RDF generation 304 wherein SOAM 104 generates RDF model 112 based on service model 108 and transmits the RDF model to ISM 102. The flow proceeds to wait function 306.

Responsive to receipt of a fault generated by a web service 110, the flow proceeds to alert generation 308 wherein SOAM 104 generates and transmits an alert signal 114 to ISM 102. According to at least one embodiment, the generated alert comprises information of an entity, e.g., the entity causing the fault generation and/or entities dependent thereon, in the service model corresponding to an entity in SID 106. The flow returns to wait function 306.

In at least one embodiment (indicated by dashed line in FIG. 3), if communication between SOAM 104 and ISM 102 has been interrupted for a given period of time, ISM 102 may request an update of information in SID 106 corresponding to service model 108 entities. Responsive to receipt of an update request from ISM 102, the flow proceeds to update generation 310 wherein SOAM 104 generates update information based on service model 108 and transmits update 118 to ISM 102. The flow returns to wait function 306.

Figure 4:
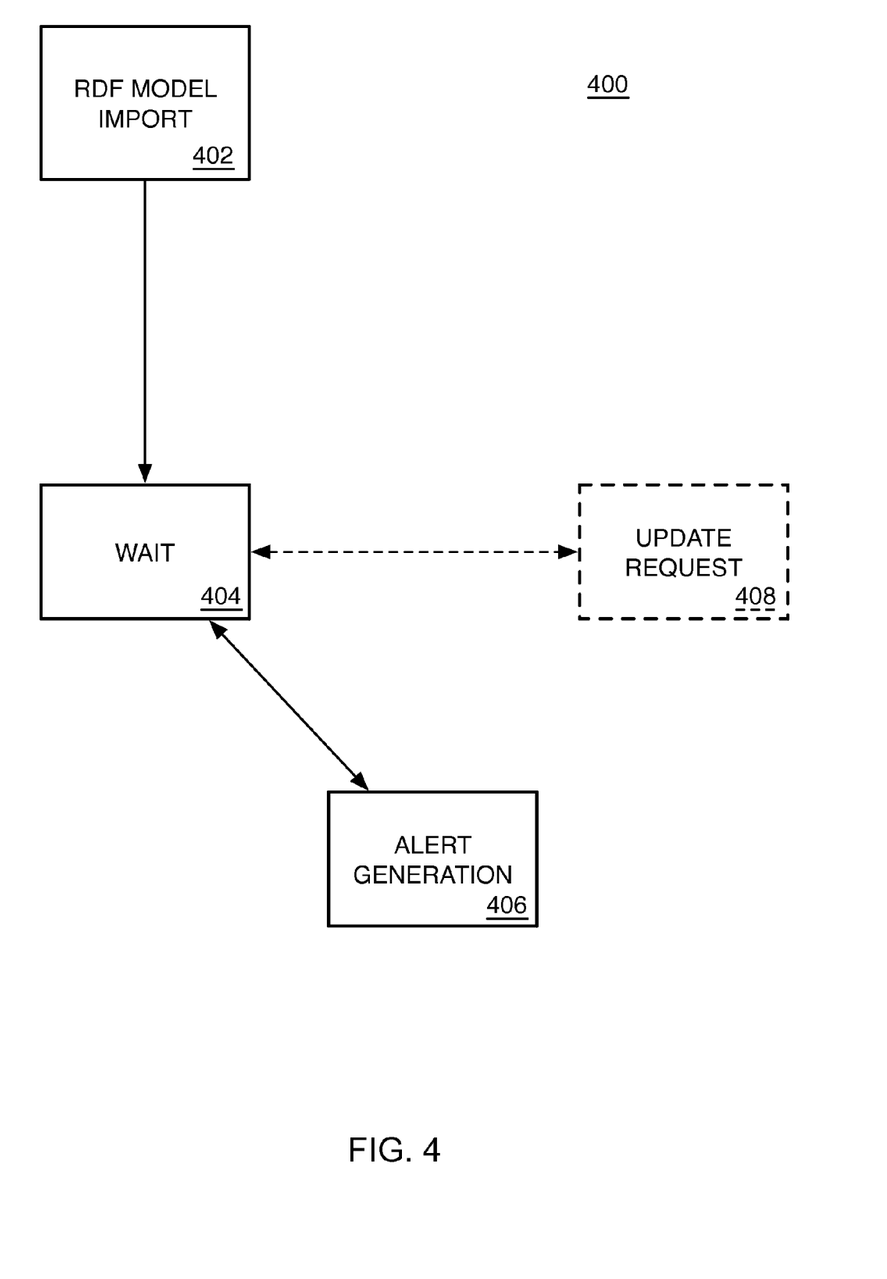
FIG. 4 is a high level process flow diagram of another portion of operation according to an embodiment.

FIG. 4 depicts a high level process flow diagram of a portion 400 of operation of ISM 102 according to an embodiment. The process flow starts at RDF model import 402 wherein ISM 102 imports RDF model 108 responsive to receipt of same from SOAM 104. The flow proceeds to wait function 404.

Responsive to receipt of alert signal 114 from SOAM 104, the flow proceeds to alert generation 406 wherein ISM 102 updates SID 106 and generates an alert for presentation to a user, e.g., by display on a monitor to a user, by transmission to a user via audio, video, and/or haptic feedback mechanisms. According to at least one embodiment, the alert received by ISM 102 comprises information of an entity, e.g., the entity causing the fault generation and/or entities dependent thereon, in the service model corresponding to an entity in SID 106.

In at least one embodiment, if communication between SOAM 104 and ISM 102 has been interrupted for a given period of time, ISM 102 may request an update of information in SID 106 corresponding to service model 108 entities. The flow proceeds to update request 408 (dashed line) wherein ISM 102 requests updated information from the SOAM based on the received alert signal. The flow returns to wait function 404.

Responsive to receipt of update 118 from SOAM 104, ISM 102 updates SID 106.

Figure 5:
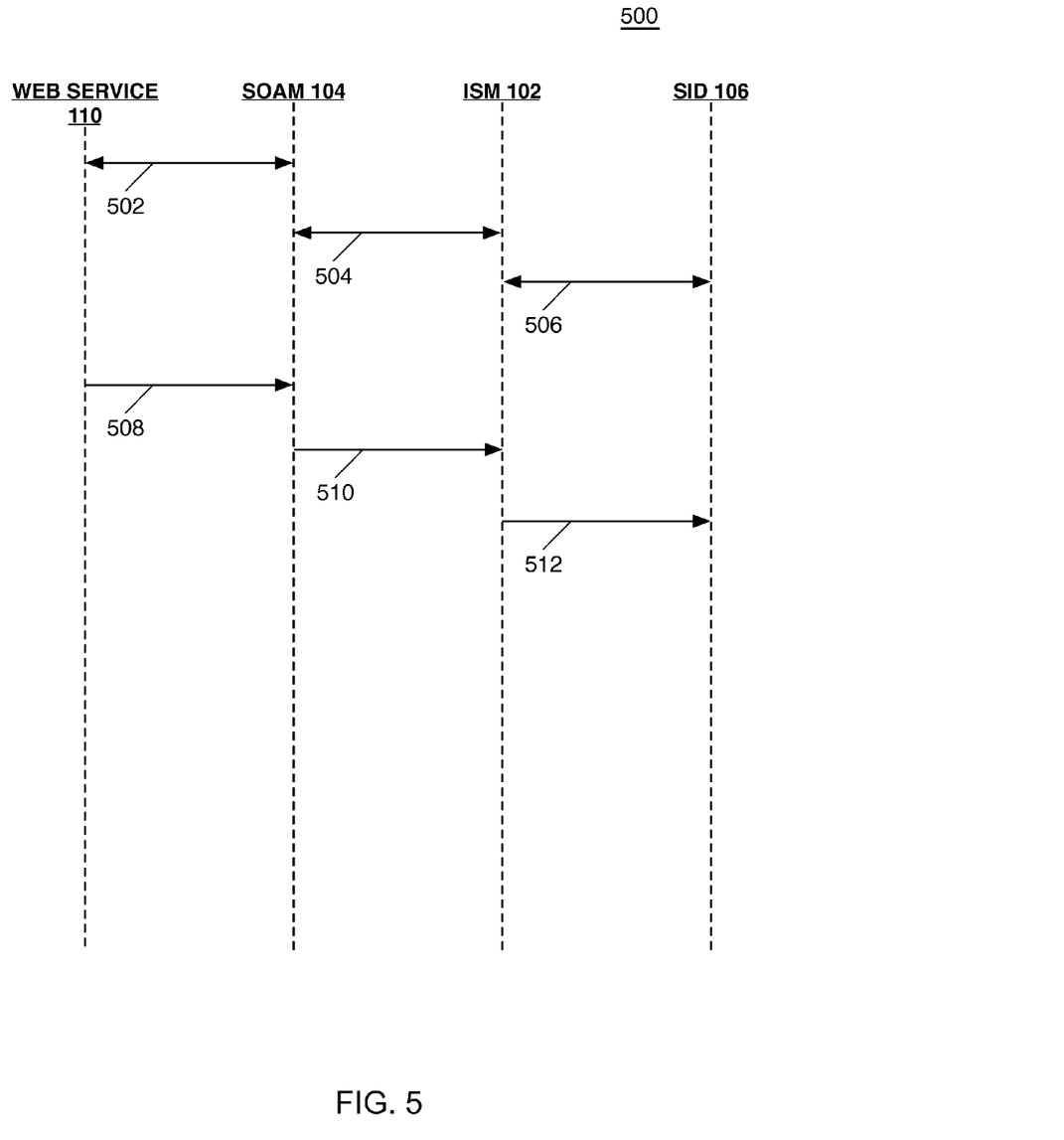
FIG. 5 is an example message sequence diagram of message flow according to an embodiment.

FIG. 5 depicts a message sequence diagram of message flow 500 according to an embodiment. Time proceeds downward along the page. As described above, SOAM 104 discovers web service 110 (sequence 502) and generates service model 108. SOAM 104 generates and transmits (sequence 504) RDF model 112 to ISM 102. Responsive to receipt of RDF model 112, ISM 102 imports (sequence 506) the RDF model to SID 106.

At a later time, web service 110 generates a fault and transmits (sequence 508) an alert to SOAM 104. Responsive to the alert from web service 110, SOAM 104 generates and transmits alert signal 114 (sequence 510) to ISM 102. According to at least one embodiment, the generated alert comprises information of an entity, e.g., the entity causing the fault generation and/or entities dependent thereon, in the service model corresponding to an entity in SID 106. In at least one embodiment, the generated alert comprises information to enable ISM 102 to update the corresponding entity/ies in SID 106.

Responsive to receipt of alert signal 114, ISM 102 imports (sequence 512) the updated information into SID 106 and generates and transmits an alert to a user.

Figure 6:
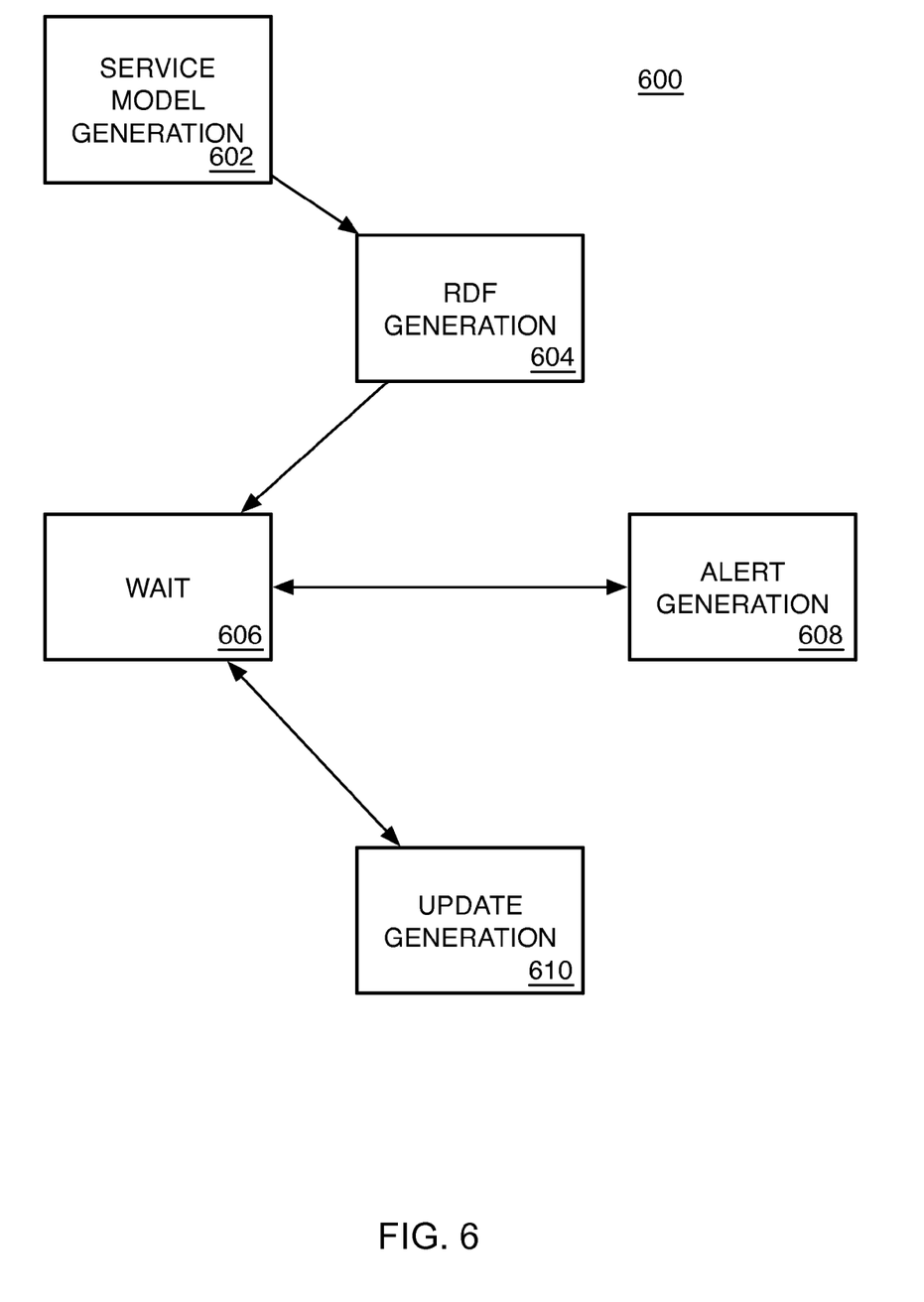
FIG. 6 is a high level process flow diagram of a portion of operation according to another embodiment.

FIG. 6 depicts a high level process flow diagram of a portion 600 of operation of SOAM 104 according to an embodiment. The process flow starts at service discovery 602 wherein SOAM 104 determines services available and generates service model 108 based on web services and business processes. The flow proceeds to RDF generation 604 wherein SOAM 104 generates RDF model 112 based on service model 108 and transmits the RDF model to ISM 102. The flow proceeds to wait function 606.

Responsive to receipt of a fault generated by a web service 110, the flow proceeds to alert generation 608 wherein SOAM 104 generates and transmits an alert signal 114 to ISM 102. The flow returns to wait function 606.

Responsive to receipt of an update request from ISM 102, the flow proceeds to update generation 610 wherein SOAM 104 generates update information based on service model 108 and transmits update 118 to ISM 102. The flow returns to wait function 606.

Figure 7:
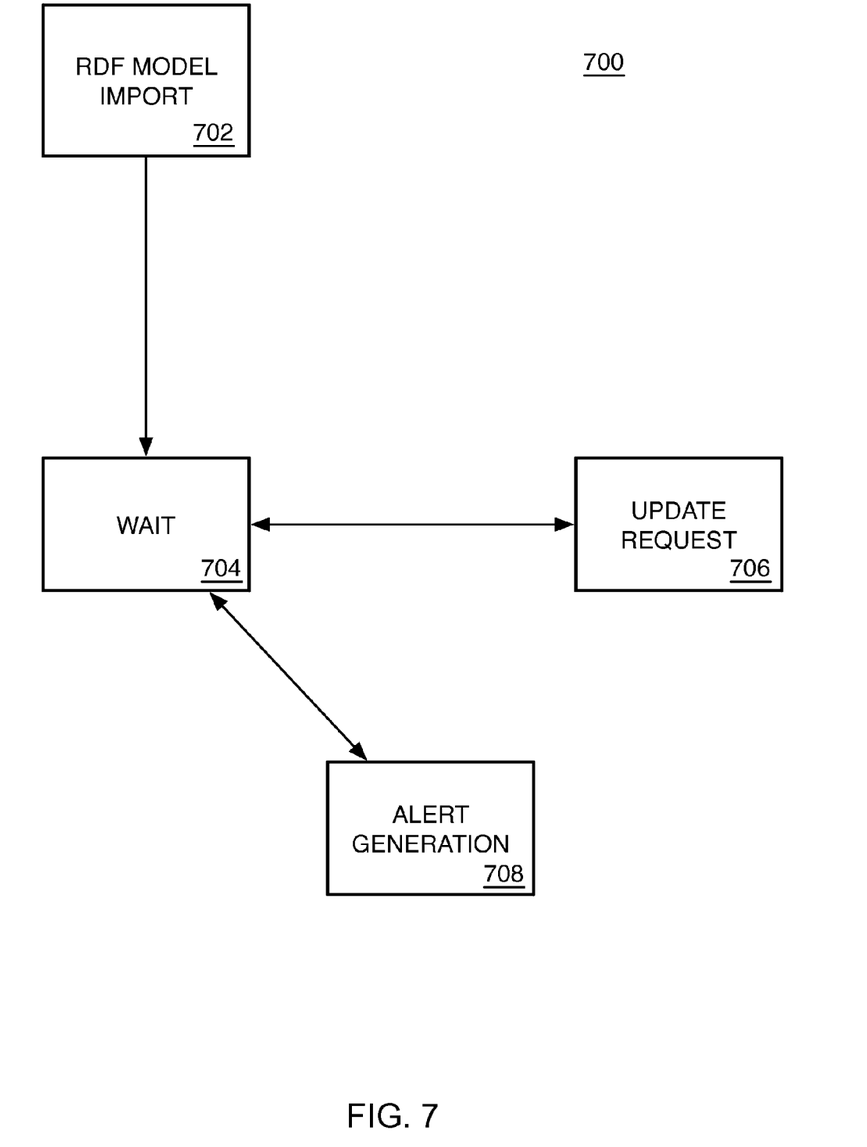
FIG. 7 is a high level process flow diagram of another portion of operation according to another embodiment.

FIG. 7 depicts a high level process flow diagram of a portion 700 of operation of ISM 102 according to an embodiment. The process flow starts at RDF model import 702 wherein ISM 102 imports RDF model 108 responsive to receipt of same from SOAM 104. The flow proceeds to wait function 704.

Responsive to receipt of alert signal 114 from SOAM 104, the flow proceeds to update request 706 wherein ISM 102 requests updated information from the SOAM based on the received alert signal. The flow returns to wait function 704.

Responsive to receipt of update 118 from SOAM 104, the flow proceeds to alert generation 708 wherein ISM 102 updates SID 106 and generates an alert for presentation to a user, e.g., by display on a monitor to a user, by transmission to a user via audio, video, and/or haptic feedback mechanisms.

Figure 8:
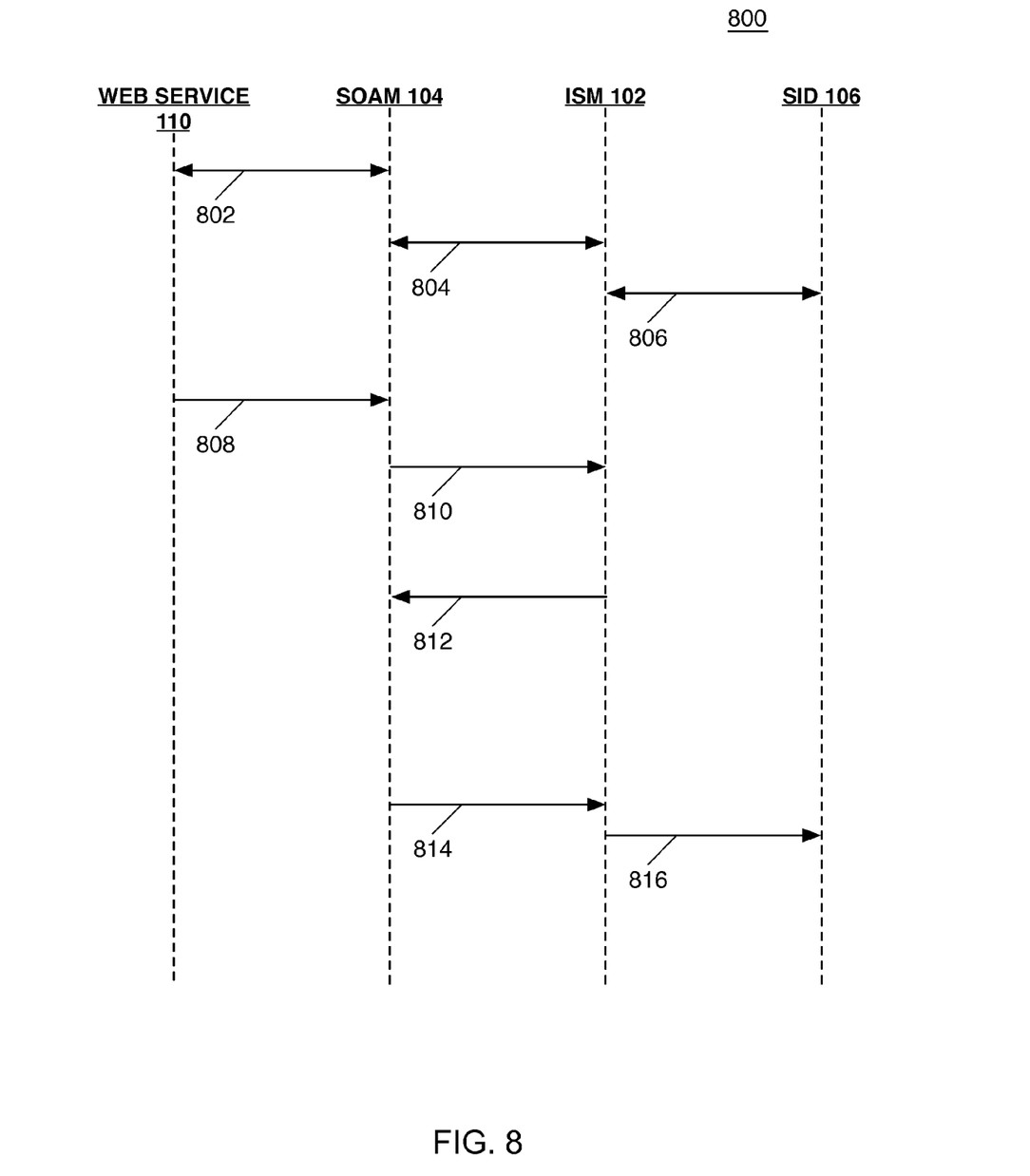
FIG. 8 is an example message sequence diagram of message flow according to another embodiment.

FIG. 8 depicts a message sequence diagram of message flow 800 according to an embodiment. Time proceeds downward along the page. As described above, SOAM 104 discovers web service 110 (sequence 802) and generates service model 108. SOAM 104 generates and transmits (sequence 804) RDF model 112 to ISM 102. Responsive to receipt of RDF model 112, ISM 102 imports (sequence 806) the RDF model to SID 106.

At a later time, web service 110 generates a fault and transmits (sequence 808) an alert to SOAM 104. Responsive to the alert from web service 110, SOAM 104 generates and transmits alert signal 114 (sequence 810) to ISM 102. Responsive to receipt of alert signal 114, ISM 102 requests (sequence 812) updated information from SOAM 104 based on the alert signal. Responsive to receipt of the update request from ISM 102, SOAM 104 transmits (sequence 814) updated information from service model 108 to ISM 102. Responsive to receipt of the updated information from SOAM 104, ISM 102 imports (sequence 816) the updated information into SID 106 and generates and transmits an alert to a user.

Some or all of the operations, functions, and methods set forth in this application may be performed by one or more computer programs including instructions and stored on a memory or other type of computer-readable storage medium. The one or more computer programs may be executed by a processor to perform the operations, functions, and methods. Examples of the operations, functions, and methods include but are not limited exporting an external model representation of at least one entity of a service model of a service oriented architecture manager; importing the exported external model representation of the at least one entity as a network management data model entity of a network manager; and subscribing, by the network manager, to subsequent updates of the at least one entity.

What is claimed is:

1. A system for unifying web services and telecom network management, comprising:
a service oriented architecture manager arranged to generate, by a processor: (a) a service model of at least one web service and (b) an external model representation of the service model; and
a network manager arranged to import the generated external model representation of the service model into a network management data model, wherein the network manager applies a rule set specifying at least one import rule to be applied to at least one entity of the generated external model representation.

2. The system of claim 1, wherein the network manager is further arranged to subscribe to alerts corresponding to changes in the service oriented architecture manager service model, comprising one of a change in the dependencies of a business service on one or more Web service, and a change in one of a fault status and a performance metric of one of the business service and the Web service.

3. The system of claim 1, wherein the rule set further comprises at least one function rule to be applied to the at least one entity of the generated external model representation.

4. The system of claim 1, wherein the network manager is further arranged to generate at least one update request responsive to receipt of an alert from the service oriented architecture manager.

5. The system of claim 1, wherein the service oriented architecture manager is further arranged to generate an alert based on a fault or performance degradation or recovery from at least one of the Web services or business services.

6. The system of claim 1, wherein the external model representation represents the at least one entity of the service model as a subject-predicate-object expression, wherein the subject-predicate-object expression is a triple expression used to describe the at least one entity of the service model.

* * * * *